(12) United States Patent
Kuroki

(10) Patent No.: US 10,955,871 B2
(45) Date of Patent: Mar. 23, 2021

(54) DIAL DEVICE AND IMAGING APPARATUS

(71) Applicant: Panasonic Intellectual Property Management Co., Ltd., Osaka (JP)

(72) Inventor: Hiroyuki Kuroki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/841,980

(22) Filed: Apr. 7, 2020

(65) Prior Publication Data

US 2021/0026394 A1 Jan. 28, 2021

(30) Foreign Application Priority Data

Jul. 23, 2019 (JP) .............................. JP2019-135248

(51) Int. Cl.
  *G05G 5/06* (2006.01)
  *G03B 17/02* (2021.01)
  *G05G 1/10* (2006.01)

(52) U.S. Cl.
  CPC ............. *G05G 5/065* (2013.01); *G03B 17/02* (2013.01); *G05G 1/10* (2013.01); *G05G 2505/00* (2013.01)

(58) Field of Classification Search
  CPC ..................... G05G 5/065; G05G 2505/00
  See application file for complete search history.

(56) References Cited

U.S. PATENT DOCUMENTS

| 6,070,020 A | * | 5/2000 | Misawa | ................. G03B 17/00 396/297 |
| 2014/0072294 A1 | * | 3/2014 | Himeno | ................. H03K 17/78 396/543 |
| 2016/0057321 A1 | * | 2/2016 | Yamaura | ................. G05G 1/015 348/373 |

FOREIGN PATENT DOCUMENTS

| JP | H11-305307 | 11/1999 |
| JP | 2009-043683 A | 2/2009 |
| JP | 2014-056761 A | 3/2014 |

OTHER PUBLICATIONS

Appendix 16/841980.*

* cited by examiner

*Primary Examiner* — Vicky A Johnson
(74) *Attorney, Agent, or Firm* — Renner, Otto, Boisselle & Sklar, LLP

(57) ABSTRACT

A dial device has a dial, a base member, a sphere; and a biasing member that is provided to one of the dial and the base member and biases the sphere toward the other one. An inner peripheral surface of an accommodation hole includes a portion in which a first hemispherical portion of the sphere is interposed between a first contact point and a second contact point, the first hemispherical portion of the sphere being on one side with respect to a first plane that includes the rotation direction and a biasing direction of the biasing member and passes through a center of the sphere. A recessed surface of each of a plurality of recesses includes a portion in which a second hemispherical portion of the sphere on another side with respect to the first plane is interposed between a third contact point and a fourth contact point.

7 Claims, 12 Drawing Sheets

DIAL DEVICE AND IMAGING APPARATUS

BACKGROUND OF THE INVENTION

Field of the Invention

The present disclosure relates to a dial device and an imaging apparatus including the dial device.

Description of the Related Art

For example, JP 11-305307 A (Patent Document 1) discloses a dial device used in an imaging apparatus. The dial device includes a dial having a plurality of click holes (recesses) on the back surface, a plurality of balls that can be engaged with the recesses of the dial, and a spring that biases a ball toward the dial in the extending direction of the rotation center line of the dial. The click holes are formed in the dial in a state of being aligned in the rotation direction of the dial in such a manner that when one ball is engaged with a click hole, the other balls do not engage with the other click holes. Thus, a click feeling is generated when the ball moves between the click holes by rotating the dial.

SUMMARY OF THE INVENTION

By the way, in the case of the dial device described in Patent Document 1, the ball is accommodated together with the spring in a ball holding hole (accommodation hole) formed in a boss so as to be movable in the extending direction of the rotation center line of the dial.

However, in this case, in order to generate a good click feeling, that is, to suppress rattling of the dial, it is necessary to make the ball holding hole with high accuracy. Specifically, it is necessary to make the ball holding hole with high accuracy and hold the ball on its inner peripheral surface so that the ball does not move in the ball holding hole while being engaged with the click hole of the dial. However, this is very difficult and expensive to manufacture, considering variations within the manufacturing tolerances of the ball and ball holding hole.

Accordingly, an object of the present disclosure is to generate a favorable click feeling by suppressing rattling of a dial in a dial device that is used in an imaging apparatus or the like and generates a click feeling.

One aspect of the present disclosure provides a dial device including a dial, a base member, a sphere, and a biasing member that is provided to one of the dial and the base member and biases the sphere toward another one of the dial and the base member. The one of the dial and the base member is provided with an accommodation hole for accommodating a part of the sphere in contact with the other one of the dial and the base member, and the biasing member. The other one of the dial and the base member is provided with a plurality of recesses that are aligned in a rotation direction of the dial and are to be engaged with the sphere. An inner peripheral surface of the accommodation hole includes a portion in which a first hemispherical portion of the sphere is interposed between a first contact point and a second contact point, the first hemispherical portion of the sphere being on one side with respect to a first plane that includes the rotation direction and an biasing direction of the biasing member and passes through a center of the sphere. A recessed surface of each of the recesses includes a portion in which a second hemispherical portion of the sphere on another side with respect to the first plane is interposed between a third contact point and a fourth contact point.

Another aspect of the present disclosure provides an imaging apparatus including the dial device described above.

According to the present disclosure, in a dial device that is used in an imaging apparatus or the like and generates a click feeling, it is possible to generate a favorable click feeling by suppressing rattling of the dial.

DESCRIPTION OF THE PREFERRED EMBODIMENTS

Hereinafter, an embodiment will be described in detail with reference to the drawings as appropriate. However, unnecessarily detailed description may be omitted. For example, detailed description of already well-known matters and redundant description on substantially the same configuration may be omitted. This is to avoid unnecessary redundancy of the following description and to facilitate understanding by those skilled in the art.

It should be noted that the inventors of the present disclosure provide the accompanying drawings and the following description to enable those skilled in the art to sufficiently understand the present disclosure. They are not intended to limit the subject matter recited in the claims.

Hereinafter, an imaging apparatus according to an embodiment of the present disclosure will be described with reference to the drawings.

Figure 1:
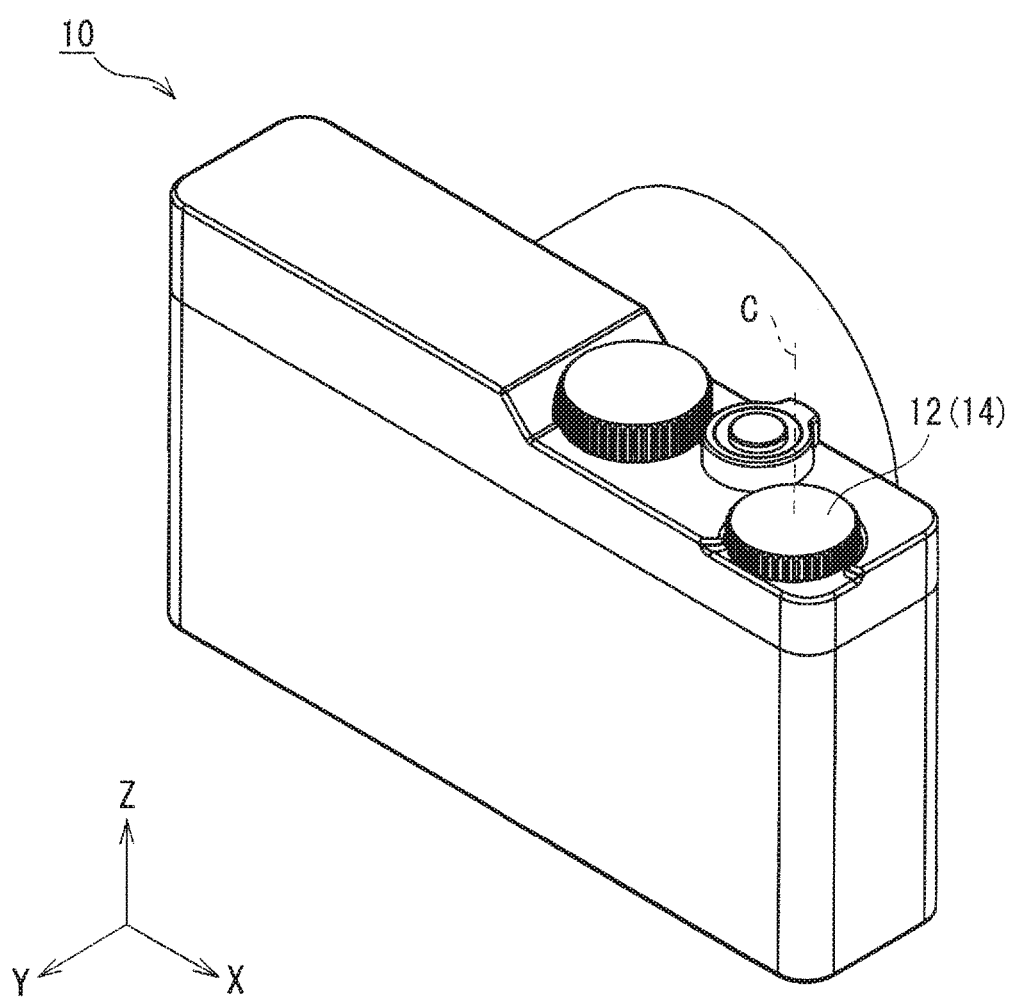
FIG. 1 is a schematic perspective view of an imaging apparatus according to an embodiment of the present disclosure.
Figure 2:
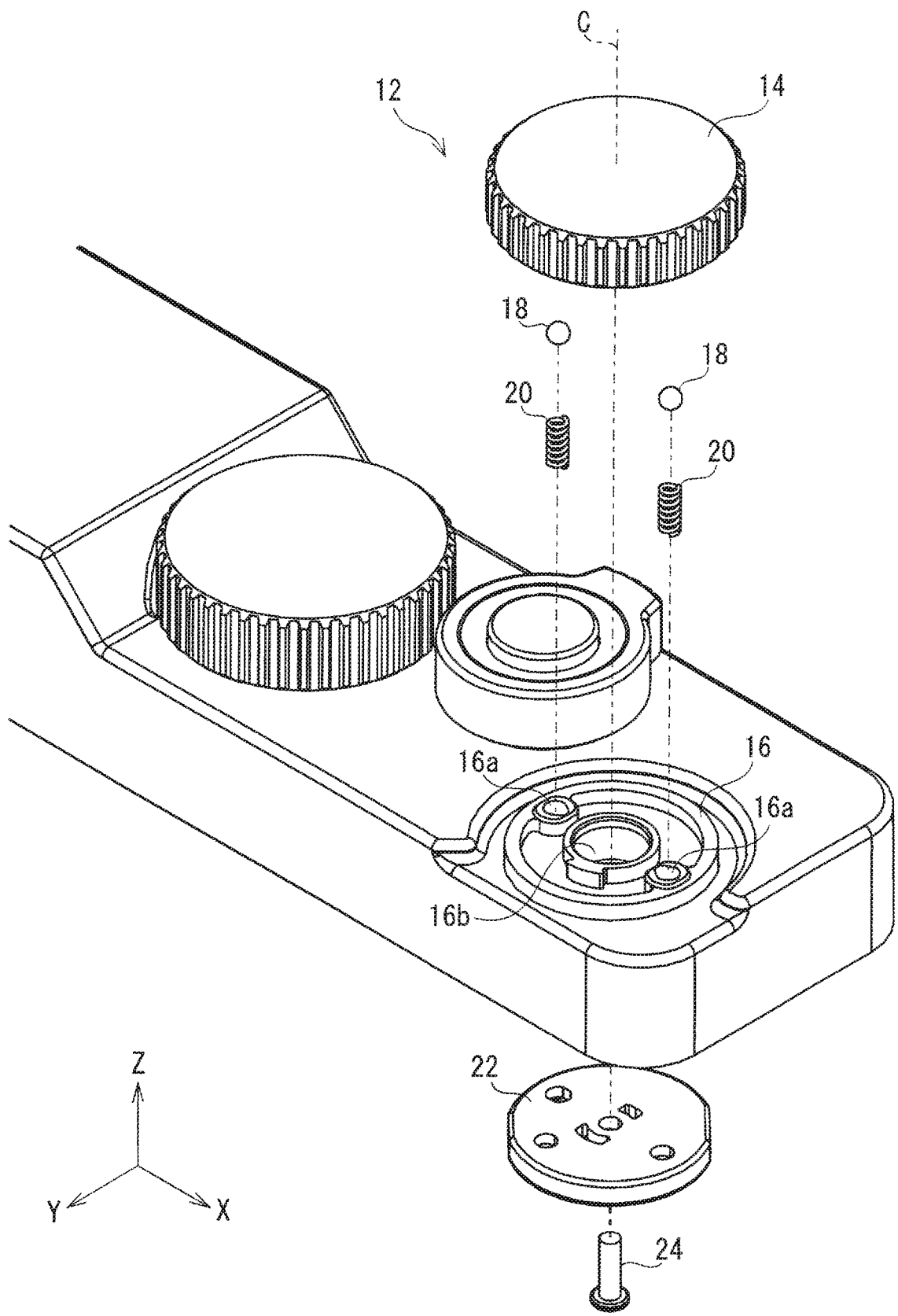
FIG. 2 is an exploded perspective view of a dial device in the imaging apparatus.

FIG. 1 is a perspective view schematically illustrating an imaging apparatus according to an embodiment of the present disclosure. FIG. 2 is an exploded perspective view of a dial device in the imaging apparatus. Note that the XYZ coordinate system shown in the drawings is for facilitating understanding of the present disclosure, and does not limit the present disclosure. Further, the X-axis direction indicates the width direction of an imaging apparatus 10, the Y-axis direction indicates the depth direction, and the Z-axis direction indicates the height direction.

As shown in FIG. 1, in the case of the present embodiment, the imaging apparatus 10 is a so-called camera, and includes a dial device 12 for setting shooting conditions and the like.

As shown in FIG. 2, the dial device 12 according to the present embodiment includes a dial 14, a base member 16, a sphere 18, and a spring (biasing member) 20 that is provided to the base member 16 and biases the sphere 18 toward the dial 14.

Figure 3:
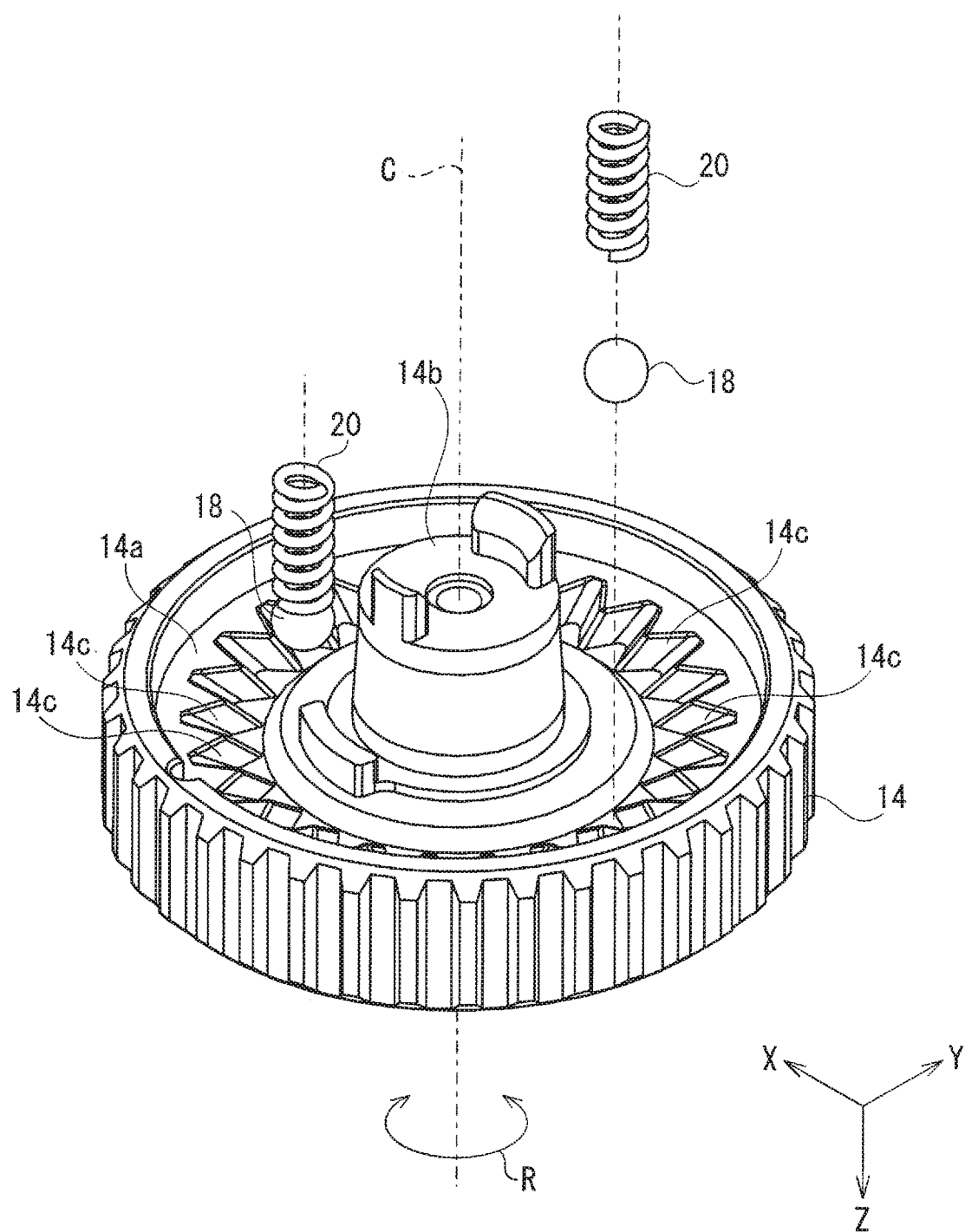
FIG. 3 is a perspective view showing the back surface of a dial with a sphere engaged.
Figure 4:
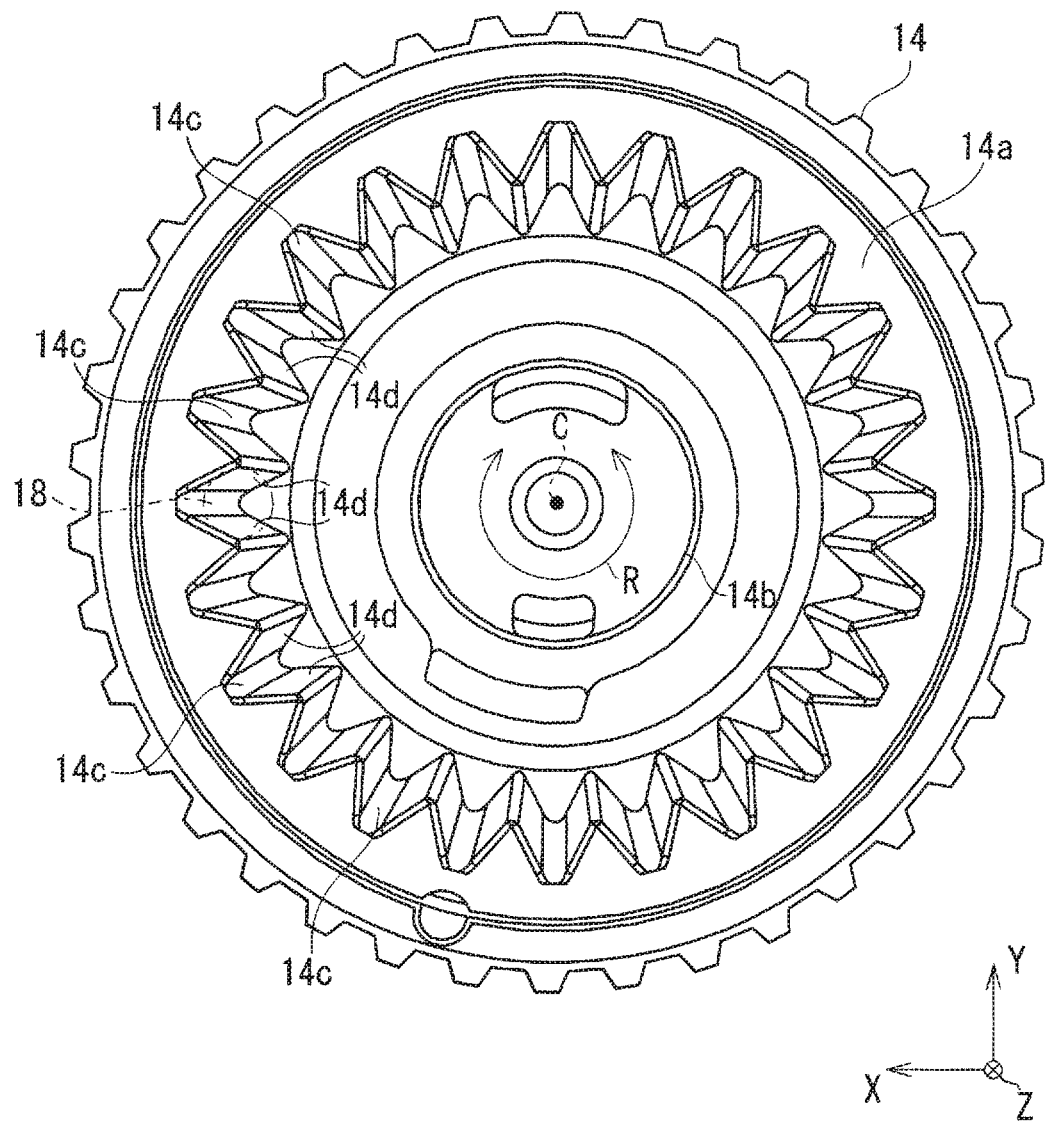
FIG. 4 is a rear view of the dial.

FIG. 3 is a perspective view showing the back surface of the dial with a sphere engaged. FIG. 4 is a rear view of the dial.

As shown in FIGS. 2 and 3, the dial 14 has a disk shape, and includes a shaft 14b that protrudes from the center portion of the back surface 14a thereof, in the extending direction (Z-axis direction) of a rotation center line C of the dial 14. The dial 14 includes a plurality of recesses 14c arranged in a rotation direction R of the dial 14 on the back surface 14a so as to surround the shaft 14b. Details of the plurality of recesses 14c will be described later.

Figure 5:
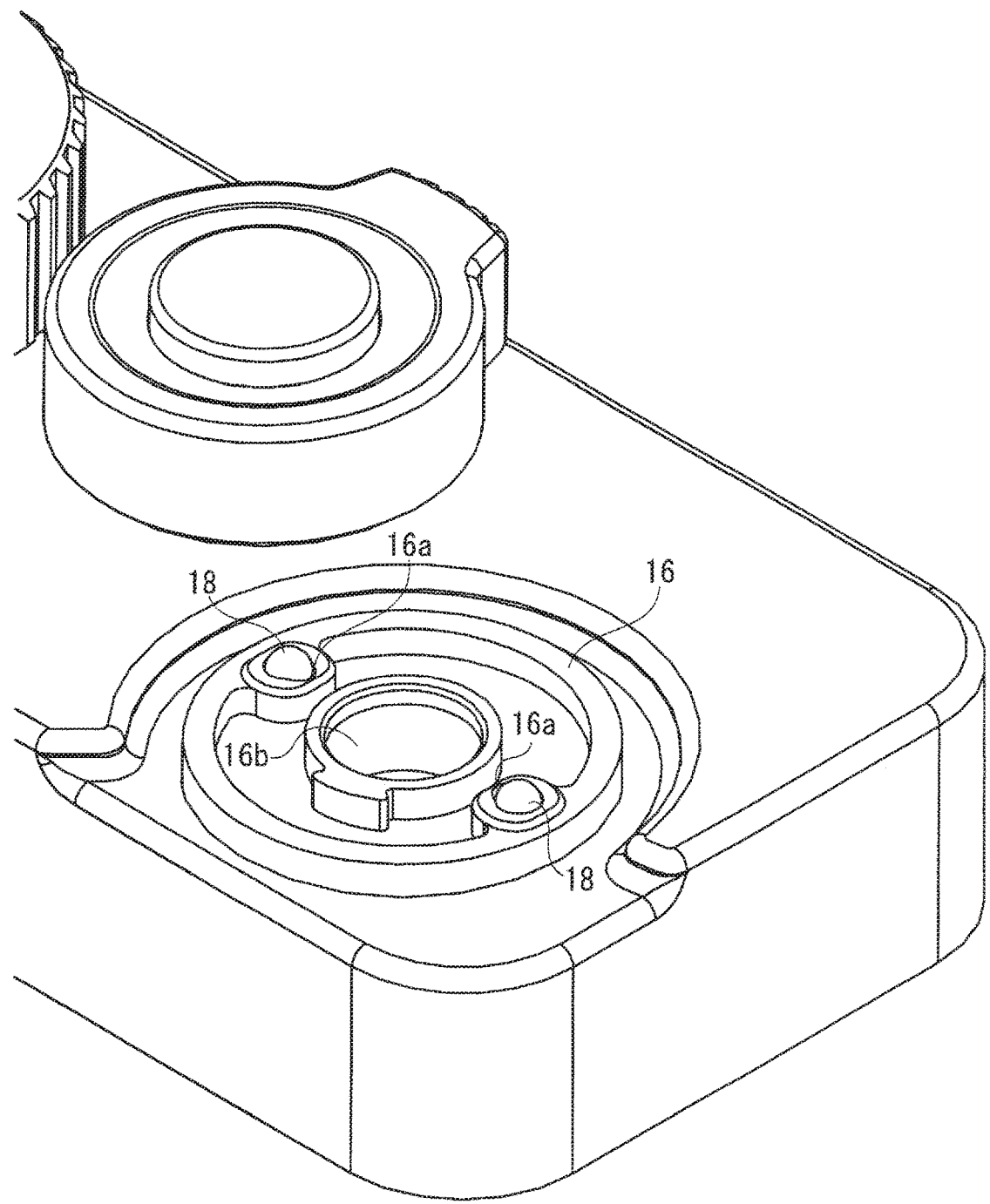
FIG. 5 is a perspective view of a base member in a state where a sphere and a biasing member are accommodated.
Figure 6:
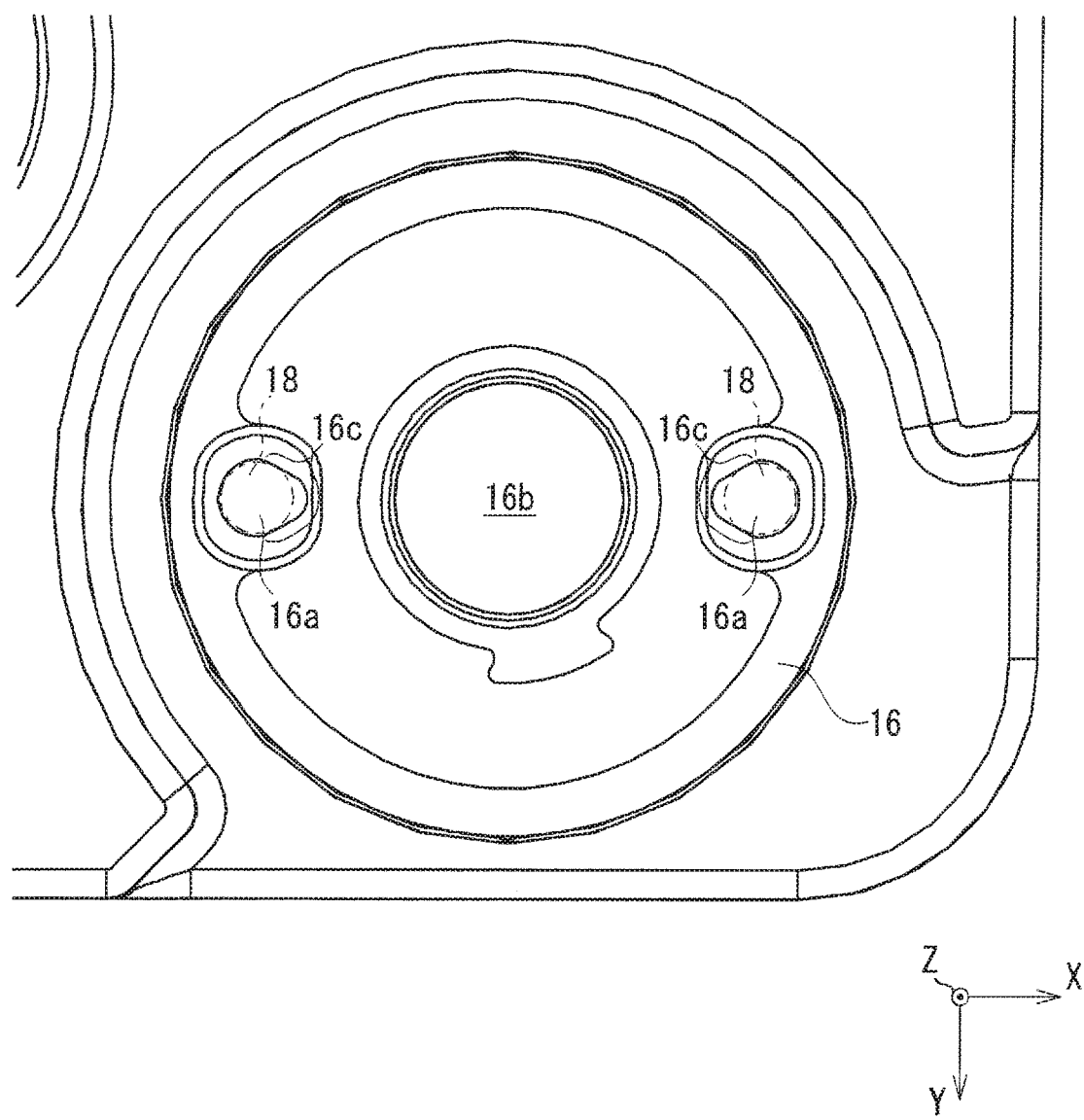
FIG. 6 is a top view of a base member.
Figure 7A:
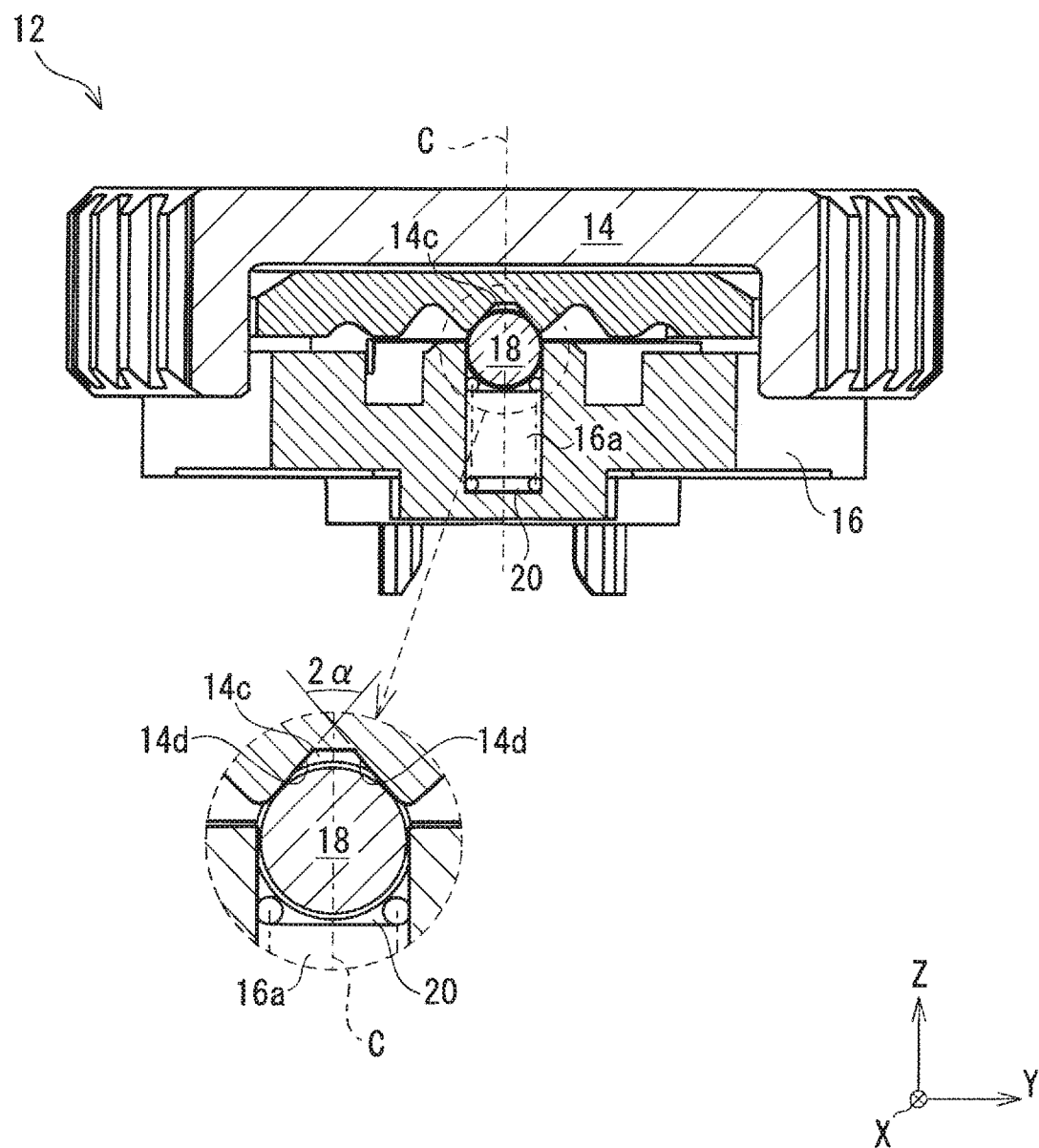
FIG. 7A is a cross-sectional view of the dial device orthogonal to the radial direction of the dial, showing the inside of an accommodation hole of the base member.
Figure 7B:
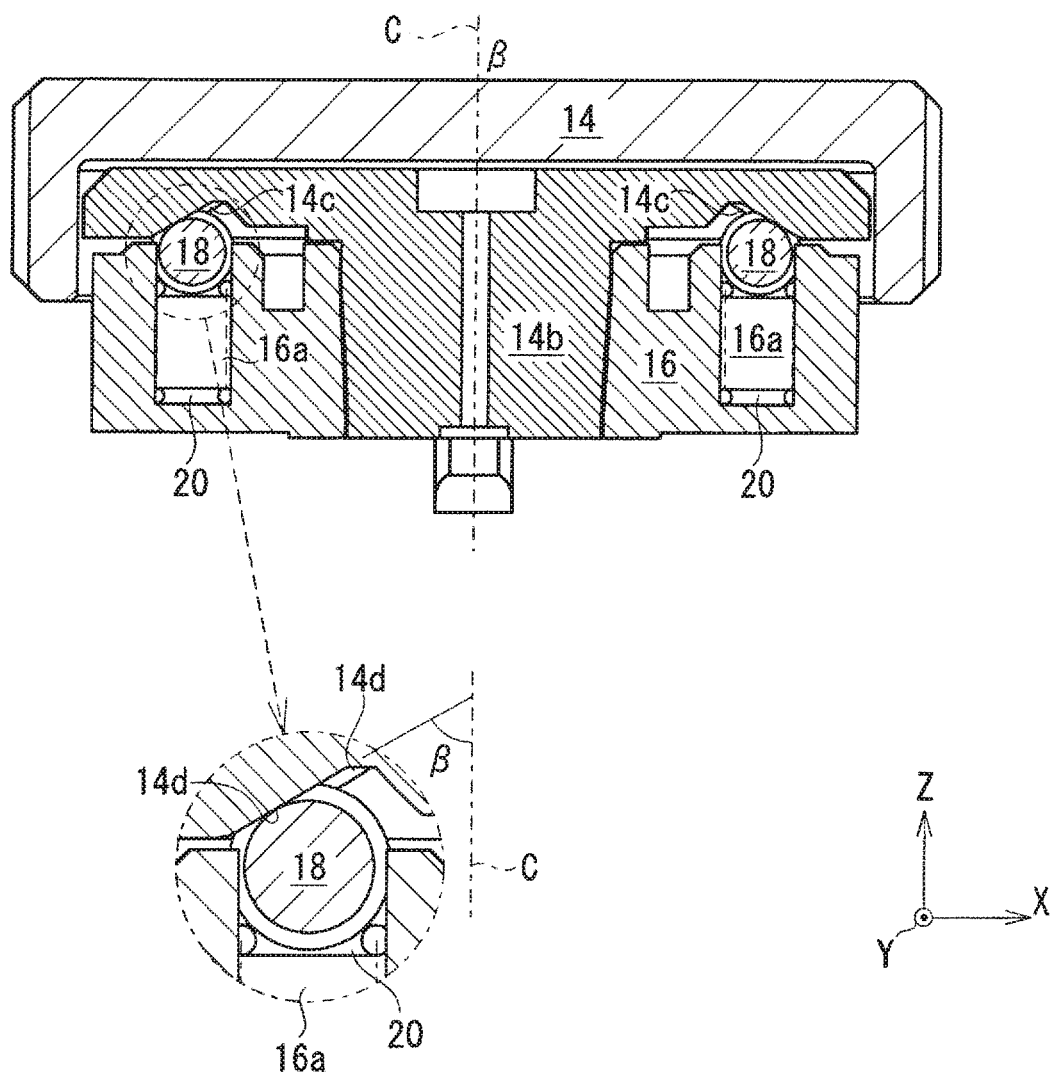
FIG. 7B is a cross-sectional view of the dial device orthogonal to the cross section shown in FIG. 7A, showing the inside of an accommodation hole of the base member.

FIG. 5 is a perspective view of the base member in a state where spheres and biasing members are accommodated. FIG. 6 is a top view of the base member. FIG. 7A is a cross-sectional view of the dial device orthogonal to the radial direction of the dial, showing the inside of an accommodation hole of the base member. FIG. 7B is a cross-sectional view orthogonal to the cross section shown in FIG. 7A, showing the inside of the accommodation holes of the base member. Note that the cross sections of FIGS. 7A and 7B do not pass through the center of the sphere 18. For this reason, the sphere 18 is partially shown in the cross sections of FIGS. 7A and 7B.

As shown in FIGS. 5 to 7B, the base member 16 has a plurality of accommodation holes 16a each of which opens toward the dial 14 (in the Z-axis direction) and accommodates the sphere 18 and the spring 20. As shown in FIG. 5, in the case of the present embodiment, the base member 16 includes a support hole 16b that rotatably supports the shaft 14b of the dial 14. As shown in FIG. 2, a disc-shaped dial holding member 22 is fixed, via a screw 24, to the tip of the shaft 14b of the dial 14 having passed through the support hole 16b of the base member 16.

The sphere 18 is made of, for example, a metal material. Further, as shown in FIGS. 3, 7A, and 7B, the sphere 18 engages with a plurality of recesses 14c provided on the back surface 14a of the dial 14. As shown in FIGS. 7A and 7B, when the sphere 18 is engaged with the recess 14c, a part, in the case of the present embodiment, a half or more, of the sphere 18 is accommodated in the accommodation hole 16a of the base member 16.

The springs 20 are accommodated in the accommodation holes 16a of the base member 16 respectively together with the spheres 18, as shown in FIGS. 7A and 7B. In the case of the present embodiment, the spring 20 biases the sphere 18 toward the back surface 14a of the dial 14 in the extending direction (Z-axis direction) of the rotation center line C of the dial 14. By being biased by the spring 20, the contact between the sphere 18 and the dial 14 is maintained, that is, the engagement of the sphere 18 with the recess 14c is maintained.

According to such a dial device 12, the sphere 18 is partly accommodated in the accommodation hole 16a of the base member 16, and the part exposed from the accommodation hole 16a is engaged with one recess 14c provided on the back surface 14a of the dial 14. When the user rotates the dial 14 around the rotation center line C, the sphere 18 moves away from the engaged recess 14c, and by the portion between the recess 14c and the adjacent recess 14c, the sphere 18 is pushed toward the depth of the accommodation hole 16a against the biasing force of the spring 20. When the dial 14 is further rotated, the sphere 18 is biased by the spring 20 and engages with the adjacent recess 14c. The movement of the sphere 18 between the recesses 14c caused by the rotation of the dial 14 provides a click feeling (impact) to the finger of the user who has rotated the dial 14. Depending on the specification, a click sound is also provided to the user.

In the case of the present embodiment, the dial device 12 is configured to generate a good click feeling, that is, to suppress rattling of the dial 14.

The "rattling of the dial" referred to here means a slight rotation of the dial that occurs because the sphere engaged with a recess of the dial can move within the accommodation hole.

In order to suppress such rattling of the dial 14, the dial device 12 is configured to hold the sphere 18 between the recess 14c of the dial 14 and the accommodation hole 16a of the base member 16. From here, the details of the recess 14c of the dial 14 and the accommodation hole 16a of the base member 16 will be described.

Figure 8:
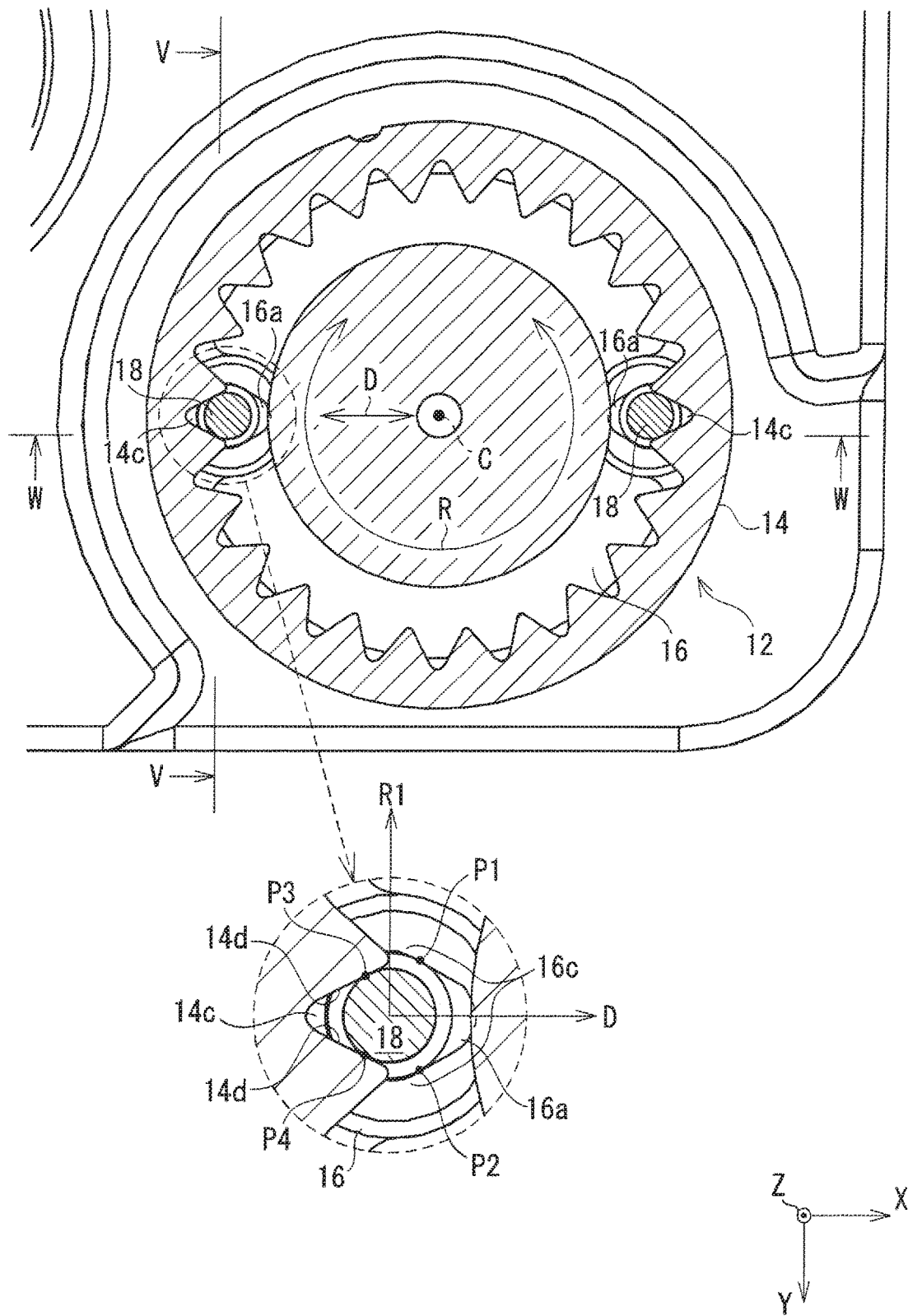
FIG. 8 is a cross-sectional view of the dial device in a state where a sphere is interposed and fixed between a recess of the dial and an accommodation hole of the base member.

FIG. 8 is a cross-sectional view of the dial device in a state where a sphere is interposed between a recess of the dial and an accommodation hole of the base member. FIG. 8 shows a cross section orthogonal to the rotation center line C of the dial 14. Note that the cross section of FIG. 8 does not pass through the center of the sphere 18. Therefore, in FIG. 8, the sphere 18 is so partially shown in a cross section. Further, in FIG. 8, a cross section indicated by line V-V is the cross section shown in FIG. 7A, and a cross section indicated by line W-W is the cross section shown in FIG. 7B.

First, as shown in FIGS. 6 and 8, the inner peripheral surface of the accommodation hole 16a of the base member 16 includes a portion 16c in which the sphere 18 is interposed (held) between first and second contact points P1 and P2, as viewed in the biasing direction of the spring 20 (viewed in the Z-axis direction). In the case of the present embodiment, the portion 16c has a symmetrical shape with respect to a plane that passes through the center of the sphere 18 in contact with the portion 16c, is orthogonal to the rotation direction R of the dial 14 (specifically, to the rotation direction R1 at the center of the sphere 18 in contact with the portion 16c), and includes the rotation center line C of the dial 14. Further, in the case of the present embodiment, as shown in FIG. 6, the portion 16c has a V shape that opens as the distance from the rotation center line C of the dial 14 increases, as viewed in the Z-axis direction.

On the other hand, the recessed surface of the recess 14c of the dial 14 includes a portion 14c in which the sphere 18 is interposed (held) between third and fourth contact points P3 and P4 as viewed in the biasing direction (Z-axis direction view) of the spring 20. In the case of the present embodiment, the portion 14c has a symmetrical shape with respect to a plane that passes through the center of the sphere 18 in contact with the portion 14c, is orthogonal to the rotation direction R of the dial 14 (specifically, to the rotation direction R1 at the center of the sphere 18 in contact with the portion 16c), and includes the rotation center line C of the dial 14. Further, in the case of the present embodiment, this portion 14c has a pair of slope surfaces 14d formed on the back surface 14a of the dial 14 in an inverted V shape that opens as it approaches the rotation center line C of the dial 14, as viewed in the Z-axis direction.

In the case of the present embodiment, as shown in FIG. 7A, the pair of slope surfaces 14*d* is a pair of planes having a developing direction in which the respective surfaces cross each other at an angle of $2\alpha$ and are away from each other as they approaches the sphere 18, as viewed in the radial direction of the dial 14. Specifically, each slope surface 14*d* is inclined at an angle $\alpha$ with respect to the extending direction (Z-axis direction) of the rotation center line C of the dial 14.

Further, in the case of the present embodiment, as shown in FIG. 7B, each of the pair of slope surfaces 14*d* is inclined at an angle $\beta$ with respect to the extending direction (Z-axis direction) of the rotation center line C of the dial 14, as viewed in the rotation direction of the dial 14. Specifically, each slope surface 14*d* is inclined so as to be away from the base member 16 as it approaches the rotation center line C of the dial 14.

By adjusting the angles $\alpha$ and $\beta$ with respect to the extending direction of the rotation center line C of the dial 14 in each of the pair of slope surfaces 14*d* shown in FIGS. 7A and 7B, it is possible to adjust the positions of the third and fourth contact points P3 and P4 of the sphere 18 in contact with the dial 14. For example, when the angle $\alpha$ is fixed, as the angle $\beta$ increases, the third and fourth contact points P3 and P4 are away from the center of the sphere 18 in the extending direction (Z-axis direction) of the rotation center line C of the dial 14. Further, for example, when the angle $\beta$ is fixed, as the angle $\alpha$ increases, the third and fourth contact points P3 and P4 are away from the center of the sphere 18 in the extending direction of the rotation center line C of the dial 14. As the third and fourth contact points P3 and P4 are further away from the center of the sphere 18, the force (rotational torque) for rotating the dial 14 becomes smaller.

Figure 9:
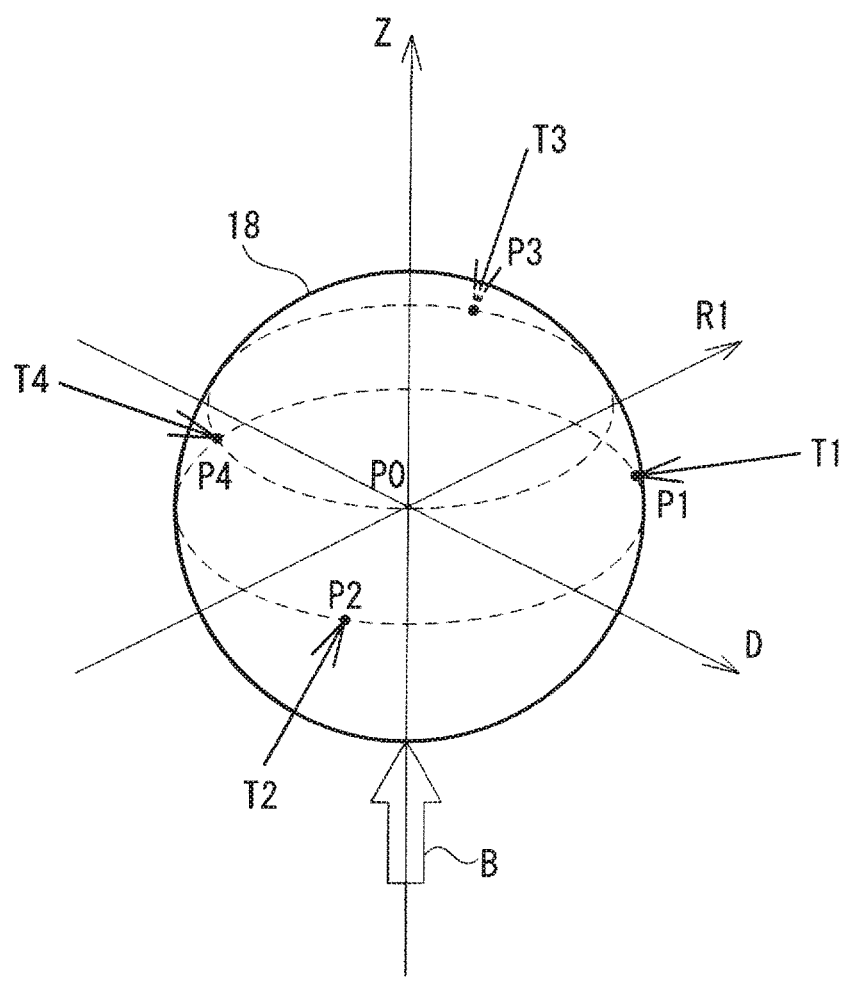
FIG. 9 is a perspective view showing a plurality of contact points on a sphere.
Figure 10:
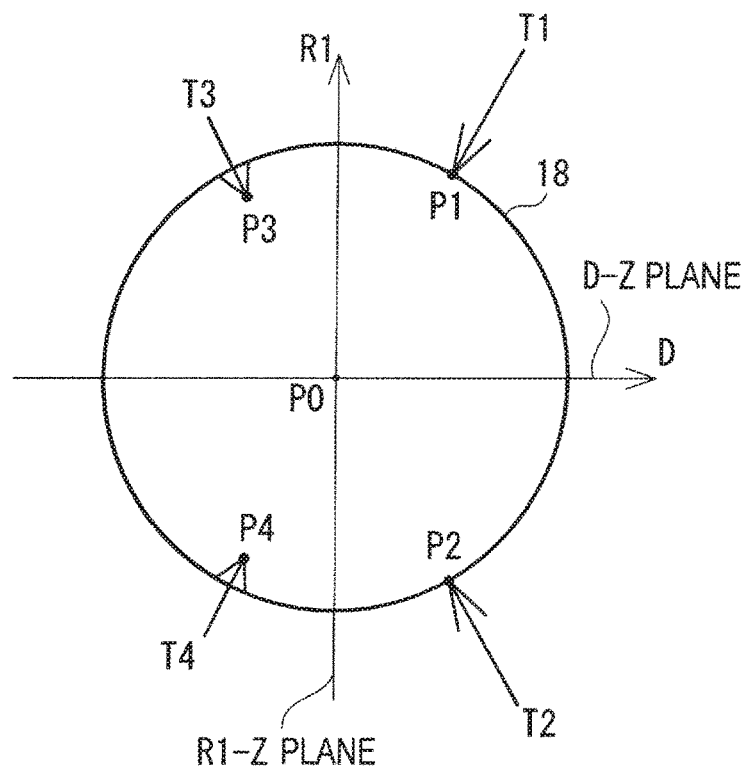
FIG. 10 shows a plurality of contact points on a sphere as viewed in the biasing direction of a biasing member.
Figure 11:
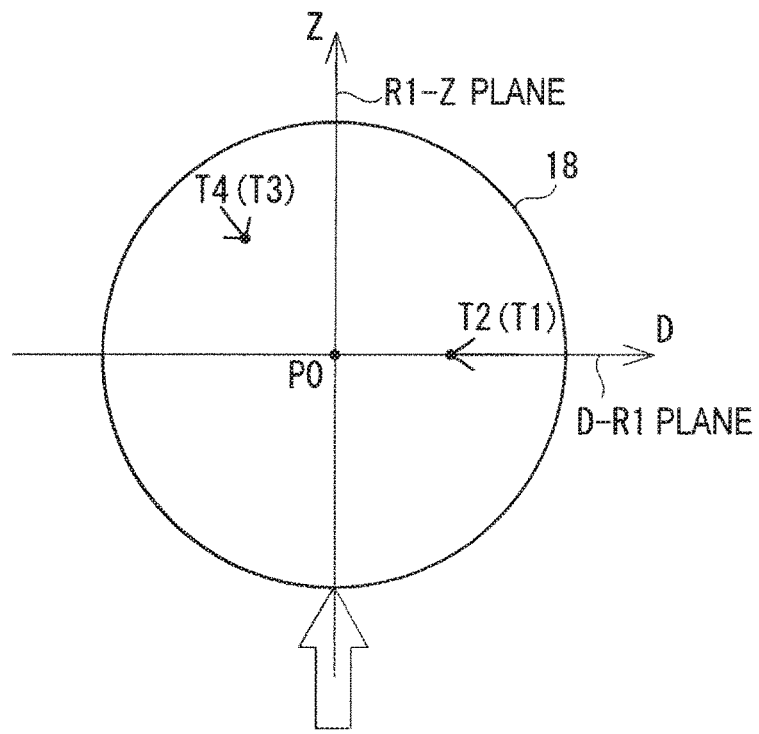
FIG. 11 shows a plurality of contact points on a sphere as viewed in the rotation direction of the dial.

FIG. 9 is a perspective view showing a plurality of contact points on a sphere. FIG. 10 shows a plurality of contact points on a sphere as viewed in the biasing direction of a biasing member. FIG. 11 is a diagram showing a plurality of points on a sphere as viewed in the rotation direction of the dial. In the R1-D-Z coordinate system shown in the figure, the R1-axis direction indicates the rotation direction R of the dial 14 at the center P0 of the sphere 18, and the D-axis direction indicates the radial direction of the dial 14.

As shown in FIGS. 9 and 10, the first and second contact points P1 and P2 with respect to the inner peripheral surface portion 16*c* of the accommodation hole 16*a* of the base member 16 are located in a hemisphere part (first hemispherical portion) on one side with respect to the R1-Z plane (first plane) passing through the center P0 of the sphere 18 and including the rotation direction (R1 axis direction) of the dial 14 and the biasing direction (Z axis direction) of the spring 20. That is, in the case of the present embodiment, the sphere 18 is in contact with the inner peripheral surface of the accommodation hole 16*a* of the base member 16 at the first and second contact points P1 and P2 in the inner side portion (inside in the radial direction D of the dial 14) of the sphere 18, as viewed in the Z-axis direction.

Further, as shown in FIGS. 7A and 7B, when the sphere 18 is engaged with the recess 14*c* of the dial 14, a half or more of the sphere 18 is positioned in the accommodation hole 16*a* of the base member 16. Therefore, the first and second contact points P1 and P2 with respect to the inner peripheral surface of the accommodation hole 16*a* are located on a D-R1 plane that passes through the center P0 of the sphere 18 and is orthogonal to the biasing direction (Z-axis direction) of the spring 20.

Further, in the case of the present embodiment, the portion 16*c* holding the sphere 18 between the first and second contact points P1 and P2 on the inner peripheral surface of the accommodation hole 16*a* of the base member 16 has a symmetrical shape with respect to a D-Z plane (second plane) that passes through the center P0 of the sphere 18, is orthogonal to the rotation direction (R1 axis direction) of the dial 14, and includes the rotation center line C of the dial 14. Therefore, the first and second contact points P1 and P2 are symmetric with respect to the D-Z plane.

On the other hand, the third and fourth contact points P3 and P4 with respect to the recessed surface portion 14*d* of the recess 14*c* of the dial 14 are located on a hemispherical portion (second hemispherical portion) on the other side with respect to the R1-Z plane (first plane) that passes through the center P0 of the sphere 18 and includes the rotation direction of the dial 14 (R1 axial direction) and the biasing direction (Z-axis direction) of the spring 20. That is, in the case of the present embodiment, the sphere 18 is in contact with the recessed surface of the recess 14*c* of the dial 14 at the third and fourth contact points P3 and P4 in the outer side portion (outside in the radial direction D of the dial 14) of the sphere 18, as viewed in the Z-axis direction.

Also, different from the first and second contact points P1 and P2, the third and fourth contact points P3 and P4 are not on the D-R1 plane passing through the center P0 of the sphere 18, but are located on the dial 14 side with respect to the D-R1 plane.

Further, in the case of the present embodiment, the portion 14*d* in which the sphere 18 is interposed between the third and fourth contact points P3 and P4 on the recessed surface of the recess 14*c* of the dial 14 has a symmetrical shape with respect to a D-Z plane (second plane) that passes through the center P0 of the sphere 18, is orthogonal to the rotation direction (R1 axis direction) of the dial 14, and includes the rotation center line C of the dial 14, Therefore, the third and fourth contact points P3 and P4 are symmetric with respect to the D-Z plane.

With such an arrangement of the contact points P1 to P4, as shown in FIG. 10, the sphere 18 is interposed and fixed by contact forces T1 to T4 and the biasing force B of the spring 20 that act on the respective contact points P1 to P4, as viewed in the biasing direction (Z-axis direction) of the spring 20.

Specifically, as shown in FIG. 10, the sphere 18 is held by the component forces in the D-axis direction of the contact forces T1 to T4, in the radial direction D of the dial 14. As for the rotation direction R of the dial 14, the sphere 18 is held by the component forces in the R-axis direction of the contact forces T1 to T4. Further, as shown in FIG. 11, in the biasing direction (Z-axis direction) of the spring 20, the sphere 18 is held by the component forces in the Z-axis direction of the contact forces T3 and T4 and the biasing force B of the spring 20. By such holding, when the sphere 18 is engaged with the recess 14*c* of the dial 14, movement of the sphere 18 in the accommodation hole 16*a* of the base member 16 is restricted. As a result, rattling of the dial 14 is suppressed.

In the present embodiment, as shown in FIG. 10, the contact points P1 and P2 are symmetric with respect to the D-Z plane, and the contact points P3 and P4 are symmetric with respect to the D-Z plane. Therefore, the contact forces T1 and T2 are equal, and the contact forces T3 and T4 are equal. As a result, the force that the user rotates the dial 14 in the forward direction and the force that the user rotates the dial 14 in the reverse direction are equal.

Further, in order to suppress rattling of the dial 14, as shown in FIG. 8, it is preferable to arrange a plurality of spheres 18, a plurality of springs 20, and a plurality of accommodation holes 16a of the base member 16 symmetrically with respect to the rotation center line C, as viewed in the extending direction (Z-axis direction) of the rotation center line C of the dial 14. Thereby, the biasing forces of the springs 20 are uniformly applied to the dial 14, and the dial 14 (the rotation center line C thereof) is prevented from being inclined. In other cases, for example, when the number of the spheres 18, the springs 20, and the accommodation holes 16a is one each, the dial 14 biased by the spring 20 through the sphere 18 (the rotation center line C thereof) may be inclined.

According to the embodiment as described above, in the dial device 12 used in the imaging apparatus 10, it is possible to suppress rattling of the dial 14 and generate a good click feeling.

Although the present disclosure has been described with reference to the above embodiment, embodiments of the present disclosure are not limited thereto.

For example, in the case of the above-described embodiment, as shown in FIG. 7, the spring 20 that is an biasing member that biases the sphere 18 and the accommodation hole 16a for accommodating the spring 20 are provided to the base member 16. Alternatively, in an embodiment different from the above-described embodiment, the spring and the accommodation hole for accommodating the spring may be provided to the dial. In that case, a plurality of recesses that are aligned in the rotation direction of the dial and engage with the spheres are provided to the base member 16.

For example, in the case of the above-described embodiment, as shown in FIG. 7, the spring 20 biases the sphere 18 in the extending direction (Z-axis direction) of the rotation center line C of the dial 14. However, the embodiment of the present disclosure is not limited to this.

Figure 12:
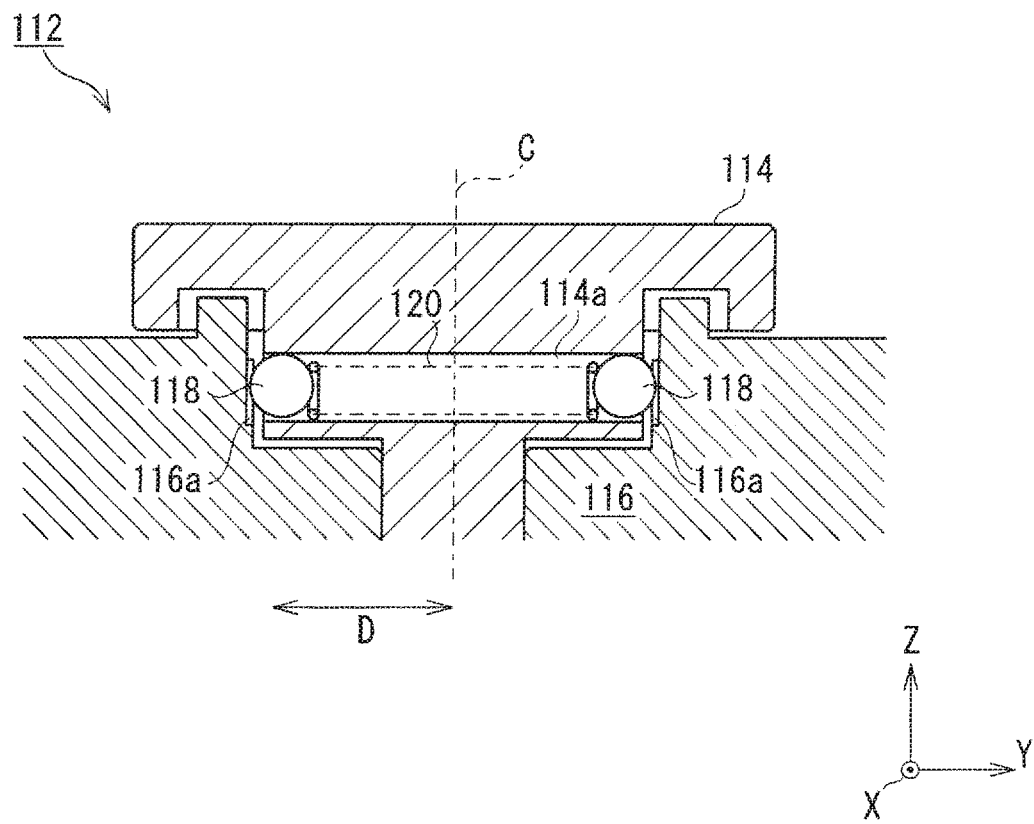
FIG. 12 is a sectional view of a dial device according to another embodiment.
Figure 13:
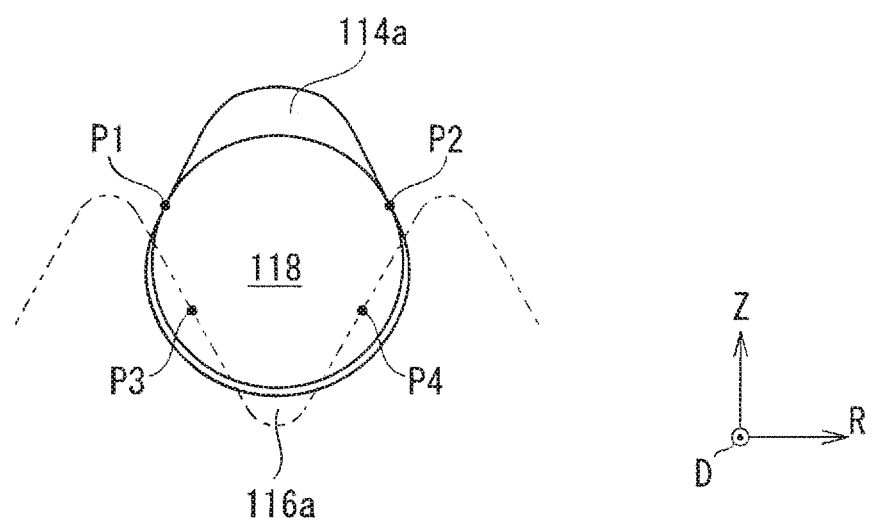
FIG. 13 shows a plurality of contact points on a sphere as viewed in the biasing direction of a biasing member in a dial device according to another embodiment.

FIG. 12 is a cross-sectional view of a dial device according to another embodiment. FIG. 13 shows a plurality of contact points on a sphere as viewed in the biasing direction of the biasing member.

In the case of a dial device 112 according to the other embodiment shown in FIG. 12, a spring 120 is formed in the shaft of a dial 114, and is accommodated in an accommodation hole 114a penetrating in the radial direction D (Y-axis direction) thereof. A sphere 118 is disposed at each end of the spring 120. The spring 120 biases the sphere 118 toward the outside of the dial 114 in the radial direction D.

On the inner peripheral surface of the base member 116 facing the opening of the accommodation hole 114a of the dial 114, a plurality of recesses 116a are provided in a state of being aligned in the circumferential direction, that is, in the rotation direction R of the dial 114.

As shown in FIG. 13, the sphere 118 is interposed between the accommodation hole 114a of the dial 114 and the recess 116a of the base member 116. Specifically, the inner peripheral surface of the accommodation hole 114a of the dial 114 is in contact with the hemisphere portion of the sphere 118 on one side at the first and second contact points P1 and P2 with respect to an RD plane including the rotation direction R of the dial 114 and the biaseing direction of the spring 120 (the radial direction D of the dial 114). On the other hand, the recessed surface of the recess 116a of the base member 116 is in contact with the hemispherical portion of the sphere 118 on the other side with respect to the R-D plane at third and fourth contact points P3 and P4.

Also in the dial device 112 according to the other embodiment shown in FIGS. 12 and 13, it is possible to suppress rattling of the dial 114 and generate a good click feeling.

In the case where the spring biases the sphere in the radial direction of the dial as in the other embodiment shown in FIGS. 12 and 13, the spring and the accommodation hole for accommodating it may be provided to the base member, in another embodiment different from the other embodiment. In that case, a plurality of recesses are provided to the outer peripheral surface of the dial shaft side by side in the circumferential direction, that is, in the dial rotation direction.

That is, the dial device according to an embodiment of the present disclosure includes, in a broad sense, a dial, a base member, a sphere, and a biasing member that is provided to one of the dial and the base member and biases the sphere toward another one of the dial and the base member. The one of the dial and the base member is provided with an accommodation hole for accommodating a part of the sphere in contact with the other one of the dial and the base member, and the biasing member. The other one of the dial and the base member is provided with a plurality of recesses that are aligned in a rotation direction of the dial and are to be engaged with the sphere. An inner peripheral surface of the accommodation hole includes a portion in which a first hemispherical portion of the sphere is interposed between a first contact point and a second contact point, the first hemispherical portion of the sphere being on one side with respect to a first plane that includes the rotation direction and a biasing direction of the biasing member. A recessed surface of each of the recesses includes a portion in which a second hemispherical portion of the sphere on another side with respect to the first plane is interposed between a third contact point and a fourth contact point.

As described above, a plurality of embodiments have been described as examples of the technology in the present disclosure. To that end, the accompanying drawings and the detailed description are provided.

Accordingly, some of the constituent elements described in the accompanying drawings and the detailed description include not only essential constituent elements for solving the problem but also constituent elements not essential for solving the problem, in order to illustrate the technique. For this reason, it should not be instantly recognized that these non-essential components are imperative as these non-essential components are described in the accompanying drawings and the detailed description.

Further, since the above-described embodiments are provided to illustrate the technique in the present disclosure, various modifications, replacements, additions, omissions, and the like can be made within the scope of the claims or their equivalents.

The present disclosure is applicable not only to an imaging apparatus but also to an apparatus having a dial device.

What is claimed is:
1. A dial device comprising:
a dial;
a base member;
a sphere; and
a biasing member that is provided to one of the dial and the base member and biases the sphere toward another one of the dial and the base member, wherein
the one of the dial and the base member is provided with an accommodation hole for accommodating a part of the sphere in contact with the other one of the dial and the base member, and the biasing member, the other one of the dial and the base member is provided with a plurality of recesses that are aligned in a rotation direction of the dial and are to be engaged with the sphere, an inner peripheral surface of the accommodation hole includes a non-circular portion in which a first hemispherical portion of the sphere is interposed between a first contact point and a second contact point, the first hemispherical portion of the sphere being on one side with respect to a first plane that includes the rotation direction and a biasing direction of the biasing member and passes through a center of the sphere, and a recessed surface of each of the recesses includes a portion in which a second hemispherical portion of the sphere on another side with respect to the first plane is interposed between a third contact point and a fourth contact point.

2. The dial device according to claim 1, wherein the non-circular portion of the inner peripheral surface of the accommodation hole in which the sphere is interposed between the first and second contact points has a symmetrical shape with respect to a second plane that is orthogonal to the rotation direction and passes through the center of the sphere, and the portion of the recessed surface of the recess in which the sphere is interposed between the third and fourth contact points has a symmetrical shape with respect to the second plane.

3. The dial device according to claim 2, wherein the non-circular portion of the inner peripheral surface of the accommodation hole in which the sphere is interposed between the first and second contact points is V-shaped as viewed in the biasing direction, and the portion of the recessed surface of the recess in which the sphere is interposed between the third and fourth contact points has a pair of slope surfaces arranged in an inverted V shape as viewed in the biasing direction.

4. The dial device according to claim 1, wherein the accommodation hole is provided to the base member, and the recess is provided to the dial.

5. The dial device according to claim 1, wherein the biasing member biases the sphere in an extending direction of a rotation center line of the dial.

6. The dial device according to claim 1, wherein a plurality of spheres, a plurality of biasing members, and a plurality of non-circular accommodation holes are arranged symmetrically with respect to a rotation center line as viewed in an extending direction of the rotation center line of the dial.

7. An imaging apparatus comprising the dial device, the dial device having:

a dial;

a base member;

a sphere; and a biasing member that is provided to one of the dial and the base member and biases the sphere toward another one of the dial and the base member, wherein the one of the dial and the base member is provided with an accommodation hole for accommodating a part of the sphere in contact with the other one of the dial and the base member, and the biasing member, the other one of the dial and the base member is provided with a plurality of recesses that are aligned in a rotation direction of the dial and are to be engaged with the sphere, an inner peripheral surface of the accommodation hole includes a non-circular portion in which a first hemispherical portion of the sphere is interposed between a first contact point and a second contact point, the first hemispherical portion of the sphere being on one side with respect to a first plane that includes the rotation direction and a biasing direction of the biasing member and passes through a center of the sphere, and a recessed surface of each of the recesses includes a portion in which a second hemispherical portion of the sphere on another side with respect to the first plane is interposed between a third contact point and a fourth contact point.

* * * * *